Feb. 28, 1967   J. H. HOLSTEIN   3,306,803
LABEL APPLYING MACHINE
Filed Feb. 25, 1963   6 Sheets-Sheet 1

JOHN H. HOLSTEIN
INVENTOR
HUEBNER & WORREL
ATTORNEYS
BY
Richard M. Worrel

JOHN H. HOLSTEIN
INVENTOR
HUEBNER & WORREL
ATTORNEYS 3,306,803
LABEL APPLYING MACHINE
John H. Holstein, 404 E. Sussex Way,
Fresno, Calif. 93704
Filed Feb. 25, 1963, Ser. No. 260,801
26 Claims. (Cl. 156—357)

This invention relates to an automatic machine for the application of labels to containers. The invention particularly relates to a label applying machine ideally suited for use in bottling and packing plants wherein the labels are applied successively to individual containers while the same are being conveyed in a rectilinear path of travel during an automated packing or bottling process preparatory to shipment of the containers from the plant.

A great variety of methods have been employed in food and drink processing plants to apply labels to containers, such as bottles, to effect a continuous flow of material and containers. In a continuous flow process, it is imperative that the labeling process does not impede the flow of containers from an entry point in their travel through the plant for the successive steps of filling, closing, labeling and packing the containers for shipment. An ideal arrangement of mechanism to perform these steps in a sequential pattern is to provide separate machines which are driven at a synchronized rate so that the individual containers proceed through each machine at the same speed as the several functions are performed. Previously known label applying machines are not suited for completely automated installations in that they are incapable of applying labels to containers while such containers are in motion. Typical of such label applying machines stop the travel of the container while the label is applied and subsequently return the container to a conveyor motivating the containers through the processing plant. Such labeling machines are an impediment to a continuous flow of containers and present obvious problems in synchronizing the movement of containers in such a plant.

In certain food and drink processing industries, the goods to be packed or bottled are of widely differing characteristics. Each of the goods may be packed in containers having a distinctive size and external configuration particularly suited to the goods or chosen for marketing reasons. In addition, each type of container may be marked with a distinctive label, the peripheral length of which may be dependent upon the type of container employed. Consequently, to permit an efficient, automated flow of containers through a diversified processing plant, a label applying machine must be capable of performing the function of applying labels of varying peripheral lengths to a great variety of container sizes and shapes. In addition, the label applying machine must be adaptable for use with existing automated food and drink processing machinery.

Accordingly, it is an object of the present invention to provide a label applying machine suited for use in automated food and drink processing plants wherein a variety of container sizes and configurations are to be encountered, which machine can accommodate such a variety and apply labels of varying peripheral lengths to the containers.

Another object is to provide a machine capable of applying labels to containers while they are being motivated at a predetermined rate.

Another object is to provide a label applying machine suitable for use in conjunction with a conveyor advancing containers along a path of travel wherein the machine performs the sequential operations of picking up individual labels, depositing glue for such individual labels, applying the labels to the individual containers, and maintaining the labels in intimate contact with their respective containers for a predetermined period of time as the containers are advanced along the path of travel.

Another object is to provide a label applying machine for use in conjunction with a container conveyor wherein label applying units are supported in a circuitous path parallel and adjacent to the conveyor and are moved toward the container during a label applying period.

Another object is to provide in a label applying machine having label applicator units adapted to pick up individual labels issued from a label magazine prior to their being applied to containers, an interlock system effective to issue a label only upon the presence of a container at a predetermined location with respect to the machine.

Another object is to provide in a label applying machine having label applicator units adapted to pick up individual labels issued from a label magazine and means to deposit glue on the labels prior to their being applied to containers, an interlock system to prevent the deposition of glue in the event of the failure of an applicator unit to pick up a label.

Another object is to provide in a label applying machine a plurality of label applicator units and support mechanism therefor to constrain the units to a predetermined circuitous path, including drive means which does not bear any of the weight of the applicator units and which materially reduces the frictional losses in the drive means.

These, together with other objects, will become more fully apparent upon reference to the following description and accompanying drawings.

*General description*

The label applying machine illustrated in the drawings and embodying the principles of the present invention will be described in connection with applying individual labels to a plurality of containers in the form of bottles and indicated at B in FIGS. 1, 2, and 3. The machine is adaptable for use in labeling a variety of bottle and other container types of varying size and configuration, when limited to a particular bottle type during a given period of operation. As a specific embodiment, the machine of the present invention is shown in conjunction with bottles having a configuration of a right circular cylinder at the peripheral area to which a label is to be applied.

The machine includes a main frame F which supports the separate components to be described. The bottles B are motivated along a rectilinear path of travel through the machine by means of a conveyor C through a labeling station. A plurality of individual label applicator units A are moved throughout a circuitous path of travel adjacent and parallel to the rectilinear path defined by the conveyor C. The applicator units A are constrained to this circuitous path of travel by means of track assemblies, indicated at T and a plurality of carrier masts CM supported therein. Reaction pads R are mounted on the masts of one track assembly to maintain the bottles on the conveyor during the label applying period.

As the applicator units A are moved about the circuitous path, individual labels are issued from a magazine M supported on the frame F. The labels are retained on the units A by means of a pneumatic system P for subsequent deposition of an adhesive on the labels by means of a glue dispensing roll G. An interlock, generally indicated at I insures that individual labels are issued from the magazine only upon the presence of a bottle B in the machine and that any label issued to an applicator unit is supplied with adhesive. In the event no label is issued to a particular applicator unit, the interlock I renders the glue roll G ineffective to deposit adhesive on the applicator unit not bearing a label. A drive means, generally indicated at D, is schematically illustrated and includes conventional disconnect means and power train shown schematically. The function of the drive means is to power the aforementioned components for synchronized movement so that the machine can operate as an integral entity.

*Conveyor*

Figures 1, 15:
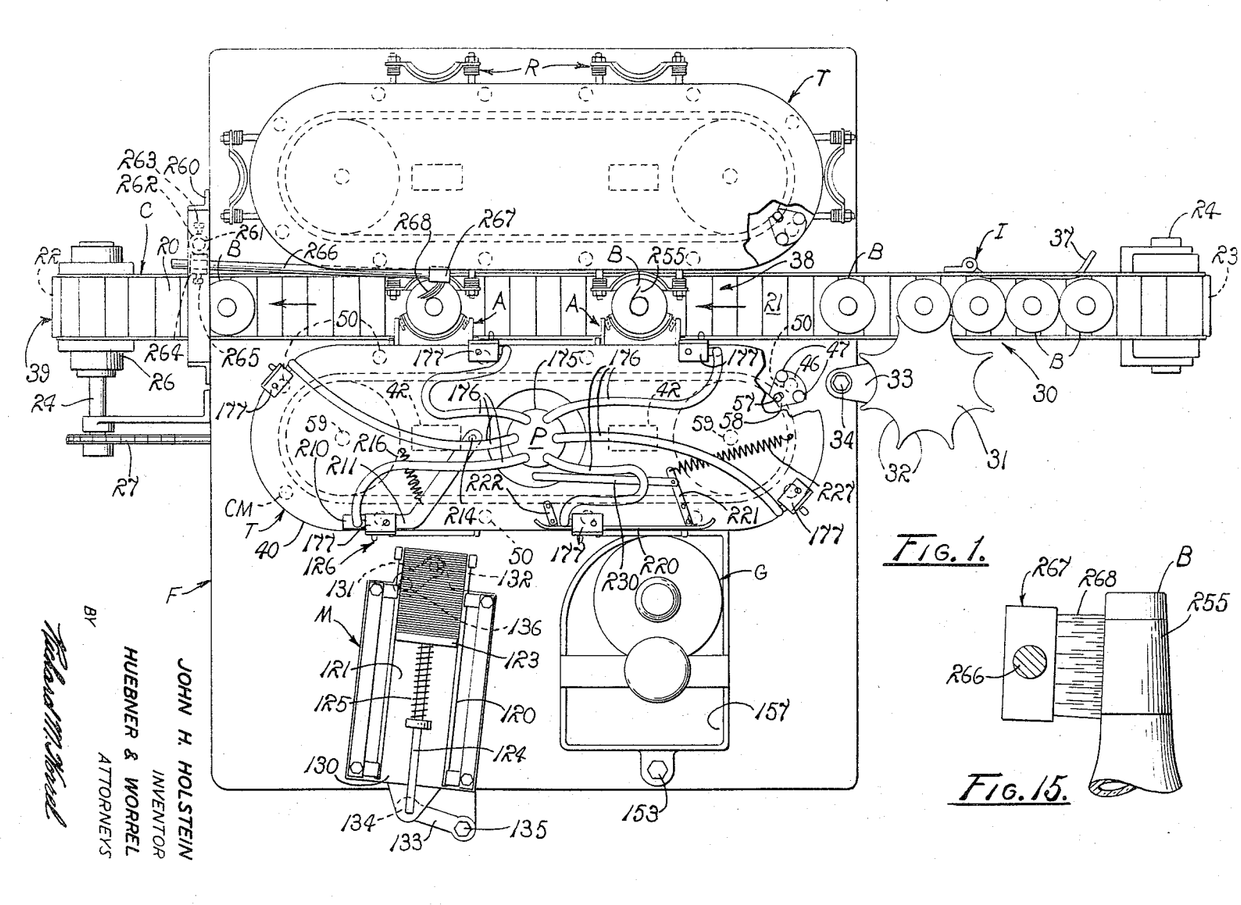
FIG. 1 is a top plan view of a label applying machine embodying the principles of the present invention and showing a plurality of containers being advanced through the machine for the purpose of applying labels thereto.
FIG. 15 is a fragmentary view in side elevation of a flexible depressor provided in the labeling machine of the present invention and adapted for use in affixing certain types of labels about the periphery of containers.
Figure 2:
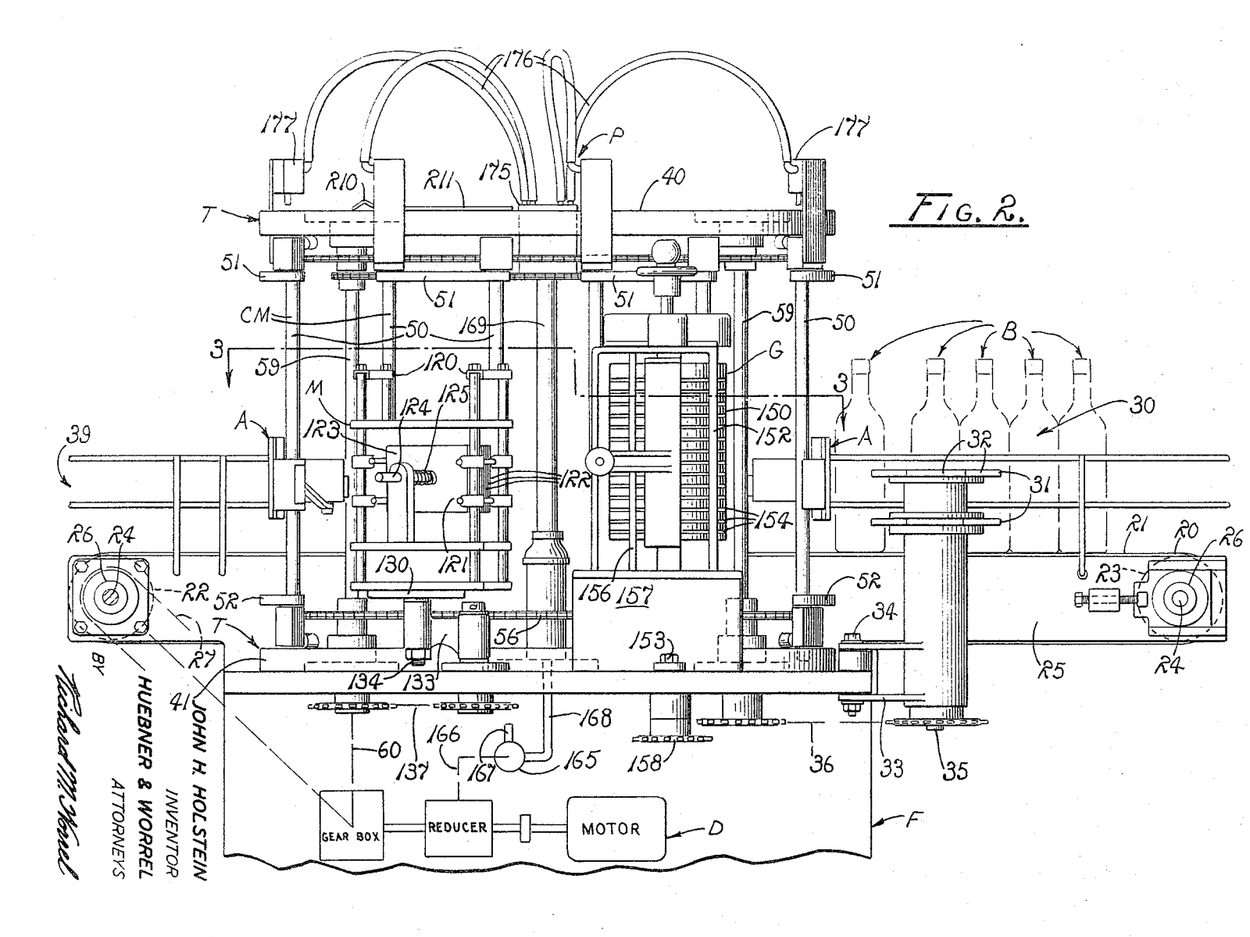
FIG. 2 is a view in side elevation of the machine shown in FIG. 1, with the power train being shown schematically.

Referring to FIGS. 1 and 2, the conveyor C comprises a continuous belt 20 having an upper run 21, which constitutes a surface of support for the bottles B as they progress through the label applying machine. The conveyor belt is trained about a pair of longitudinally spaced pulleys 22 and 23, each of which includes a supporting shaft 24 mounted for rotation in a portion 25 of frame F by means of laterally opposed bearings 26. As viewed in FIG. 1, the pulley 22 at the left side is powered for rotation by a portion of the drive means D, schematically indicated at 27. This arrangement maintains the upper run 21 of the conveyor in a taut condition so that the rate of movement of the bottles over the rectilinear path of travel provided by the conveyor is uniformly maintained.

At the right side of FIGS. 1 and 2, a bottle admission station is generally indicated at 30 and includes a starwheel 31 provided with a plurality of peripheral concave recesses 32. The starwheel is pivotally mounted on the frame 25 by means of a bracket 33 adjustably retained by a bolt 34. This permits the starwheel to be adjusted laterally relative to the conveyor to accommodate bottles of configurations and diametrical dimensions different from that shown.

The starwheel 31 is powered for rotation by means of a drive shaft 35 rotatably mounted in the bracket 33 and operatively connected to a portion 36 of the power train included in the drive means D. The presence of bottles at the admission station 30, subsequently to be spaced uniformly on the upper run 21 of the conveyor 20 by the starwheel, is noted by the interlock I. A detector member 37 disposed adjacent to the admission station and overlying a portion of the upper run of the conveyor is engageable by the bottles as they move through the admission station. The purpose of the detector member of the interlock will be explained in detail below.

The conveyor 20 extends through the machine from the bottle admission station 30 through a label applying station 38, which constitutes a substantial length of the conveyor, and ends at a discharge station 39. Bottles discharged from the conveyor are transported to another station in the packing plant, not shown, such as a packing station. The means for such transportation may be a conveyor similar to the conveyor 20 and motivated at a comparable rate to permit a continuous flow of bottles through the plant.

*Track assemblies and carrier masts*

The details of the track assemblies T and the carrier masts CM are most clearly shown in FIGS. 1, 2, 4 and 5. The machine includes a pair of identical track assemblies supported on the frame in opposite positions laterally of the conveyor C. Since the track assemblies are substantially identical and each includes a plurality of identical carrier masts, only one of each of these components will be here described.

Each of the track assemblies T comprises elevationally spaced upper and lower deck members 40 and 41 respectively rigidly secured to a pair of longitudinally spaced upright standards 42 to maintain the deck members in parallel superimposed relationship. The lower deck member 41 is secured to the frame by means of bolts indicated at 43 in FIG. 5.

The deck members 40 and 41 are provided with respective races 44 and 45 in the form of channels in opposed overlying and elevationally spaced relationship. The races provide bearing surfaces for a pair of swivel blocks or trucks 46 provided at both ends of each of the carrier masts CM. Each of the swivel blocks includes a pair of longitudinally spaced guide pins 47 as cylindrical bearing members received in the race of the respective deck member. Each swivel block is provided with a bearing cavity 48.

Each of the carrier masts CM includes a pair of mast rods 50 having their ends rotatably received in the bearing cavities 48 of the swivel blocks 46 and maintained in a predetermined relationship by upper and lower connecting links 51 and 52. The links are secured to the rods by means of setscrews 53 and relative motion between the swivel blocks and the mast rods is enhanced by means of bushings 54 interposed between the links and the blocks.

The carrier masts CM are motivated about each track assembly T by means of a pair of longitudinally spaced sprockets 55 rotatably mounted in each of the upper and lower deck members 40 and 41. A continuous chain 56 is trained about each pair of sprockets and is provided with a plurality of drive pins 57 uniformly spaced about the extent of the chain. In the machine illustrated, each track assembly is provided with six carrier masts. Accordingly, each chain 56 carries six drive pins 57. Each of the pins is received in a yoke 58 extended from the rear swivel block 46 associated with each carrier mast. The upper and lower sprockets are interconnected by vertical shafts 59. One of the shafts 59 in each of the track assemblies is connected to the drive means D; this connection is shown schematically in FIG. 2 and indicated at 60. When so connected to the power train, the track assemblies and the carrier masts constitute means to transport the applicator units A mounted on the carrier masts in a circuitous path parallel and adjacent to the rectilinear path of travel of the bottles B through the machine.

Label applicator units

Referring more particularly to FIGS. 4–10, it can be seen that each of the label applicator units is adjustably elevationally mounted on a respective carrier mast CM by means of a U-shaped mounting bracket 70 having laterally opposed concave mounting lugs 71 partially to receive the mast rods 50. The mounting bracket is secured to one of the mast rods by means of a setscrew, indicated at 72. This permits the applicator units to be carried at a predetermined height on their respective mast so as to accommodate a particular container.

The details of the applicator units A are most clearly shown in FIGS. 6 through 10. In each of these units, the mounting bracket 70 is provided with laterally opposed channels 73 which include bearing surfaces indicated at 74 as guideways for rectilinear motion substantially normal to the plane generally defined by the mast rods 50 of a given carrier mast. A carriage 75 is adapted for such rectilinear motion by means of a pair of laterally opposed slide arms 76 received respectively in the channels 73 and interconnected by a cross member 77. The carriage is biased to a retracted position shown in FIG. 9 by means of a pair of retraction springs 78 which are also visible in FIG. 10. The springs 78 are interconnected between anchorages 79 respectively provided on the carriage 75 and the mounting bracket 70.

To actuate the carriage in the rectilinear path of movement aforementioned, a cam follower linkage, generally indicated at 80, is operatively connected to the carriage. The follower linkage includes a cam follower 81 rotatably mounted on a lever 82 connected to the mounting bracket 70 by means of a pivot pin 83. The free end of the lever 82 is bifurcated to form a yoke 84 in which is received a drive bushing 85 rotatably mounted on a stub shaft 86 secured to the cross member 77. A cam fragmentarily illustrated at 87 is secured to the upright standards 42 of one of the track assemblies T to effect movement of the carriage 75 at a predetermined point in the circuitous path of travel defined by the track assembly. This is illustrated in FIG. 3, and the effective length of such cam is co-extensive with the label applying station selected.

To prevent any binding of the slide arms 76 on the bearing surfaces 74 provided by the channels 73, a synchronizing shaft 90 is rotatably mounted in the arms and provided with laterally opposed pinion gears 91 fixed to the shaft. The pinion gears mesh with respective rack bars 92 secured to the bracket 70 and thereby insure equal and synchronized movement by both slide arms 76 of the carriage.

Two laterally opposed pad support arms 95 are mounted for rocking movement about respective vertical axes provided by pivot pins 96 received in each of the slide arms 76. Each of the pad support arms carries a pad attachment block 97 secured thereto by retaining bolts 98. A resilient applicator pad 99 extends between the attachment blocks 97 and is bonded to these blocks as by a heat cured adhesive. The pad is preferably formed of a closed-cell elastomeric material and provided with a relatively smooth impermeable face 100 adapted to support a paper label thereon and subsequently to conform to the peripheries of the bottles B. The applicator pad is also provided with a pair of vacuum conduits 101 in communication with the label receiving face 100 of the pad by means of passageways, indicated at 102.

A backing block 105 is supported in the bracket for limited movement by means of a push rod 106. The rod carries a cam follower 107 at its projecting end and both are received in a slideway 108 formed in a bearing block 109. The bearing block is secured to the mounting bracket by means of screws, indicated at 110. The backing block 105 and push rod 106 are also adapted to permit movement of the carriage 75 from a retracted position to a position of label application by means of a bore 111 in the cross member 77 through which the push rod 106 extends. In the event of actuation of the backing block by means of the cam follower 107, movement of the carriage is insured by the provision of a stop collar 112 fixed to the push rod 106 and engageable with the cross member 77. This is desired in connection with applying glue to a label supported on the face 100 of the applicator pad, and will be discussed in detail below.

Figure 9:
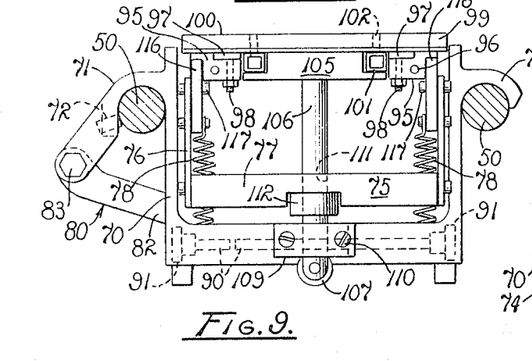
FIG. 9 is a top plan view of the label applicator unit of FIG. 6.
Figure 10:
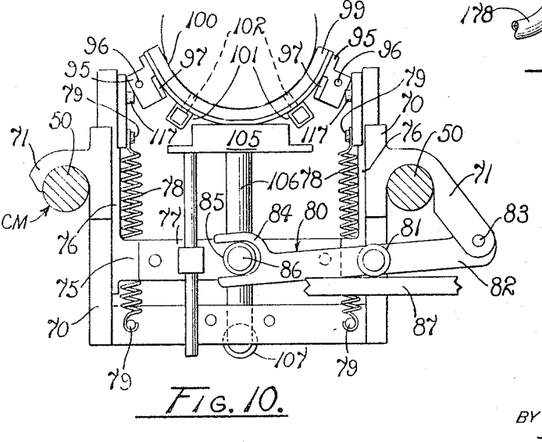
FIG. 10 is a bottom plan view of the applicator unit of FIG. 9 shown in a label applying position.

So that the applicator pad 99 will assume the position shown in FIG. 9 with the face 100 in one plane, the pad support arms 95 are biased into engagement with stop plates 116 respectively secured to each slide arm 76 of the carriage by means of screws 117.

Magazine

The structural details of the magazine M and the mechanism mounting it for oscillatory movement are shown in FIGS. 1, 2, 3 and 4. The magazine includes a main support frame 120 in which is mounted a label receiving tray 121. The tray is longitudinally extended and is of a cross-sectional area adapted to receive the particular label 122 to be applied. Assuming that the bottles B shown in connection with the present embodiment of the machine have a diameter of 3", and that the labels to be applied are to cover approximately 120° of the peripheral length, the labels are approximately 3.2" in length when confined to the tray 121.

Unidirectional pressure is exerted against the supply of labels 122 by means of a pressure plate 123 secured to an elongated guide rod 124 aligned with the longitudinal axis of the tray 121. A spring 125 is supported on the guide rod and interposed between the frame 120 and the plate 123 to urge the labels toward an issuing station 126. The labels are normally retained within the tray and prevented from being discharged at the issuing station by laterally opposed pairs of retaining fingers 127 secured to the frame 120.

The magazine frame 120 includes a rigid base 130 pivotally connected to a crank 131 by means of a pivot pin 132. The opposite end of the base 130 is connected to a lever 133 by means of a pin 134. A lever 133 is pivotally anchored to the frame F at 135 so that the magazine, the crank 131, and the lever 133 constitute a beam and crank mechanism. The base 130 serves as a link between the crank 131 and the lever 133. The crank 131 is secured to a shaft 136 mounted for rotation in the frame F and powered by a portion 137 of the power train, generally indicated at D. It is to be noted that the beam and crank mechanism, actuated through the drive 137 and the shaft 136, effects oscillatory movement of the label issuing station 126 of the magazine in a path of travel, a part of which, at the time of label issuance, is substantially parallel to a portion of the circuitous path defined by one of the track mechanisms T and throughout which the applicator pads travel during operation of the label applying machine. The synchronized power train D insures that the applicator pads and the issuing station of the magazine are traveling at the same rate throughout this part of the magazine path of travel.

To insure that the labels 122 are individually discharged at the issuing station 126, two air discharge riffling nozzles 140 are mounted on opposite sides of the magazine frame. The nozzles are each provided with a flexible air supply conduit 141 and connected to a suitable source of air under pressure. As described below, the conduits 141 are connected to the discharge side of a vacuum pump incorporated in the pneumatic system P.

Glue roll

The glue roll G includes a cylindrical roller 150 supported for rotation about a vertical axis in vertically spaced bearings 151 mounted in a roller frame 152. The roller frame is secured to the main frame F of the machine as by bolts 153.

Figure 5:
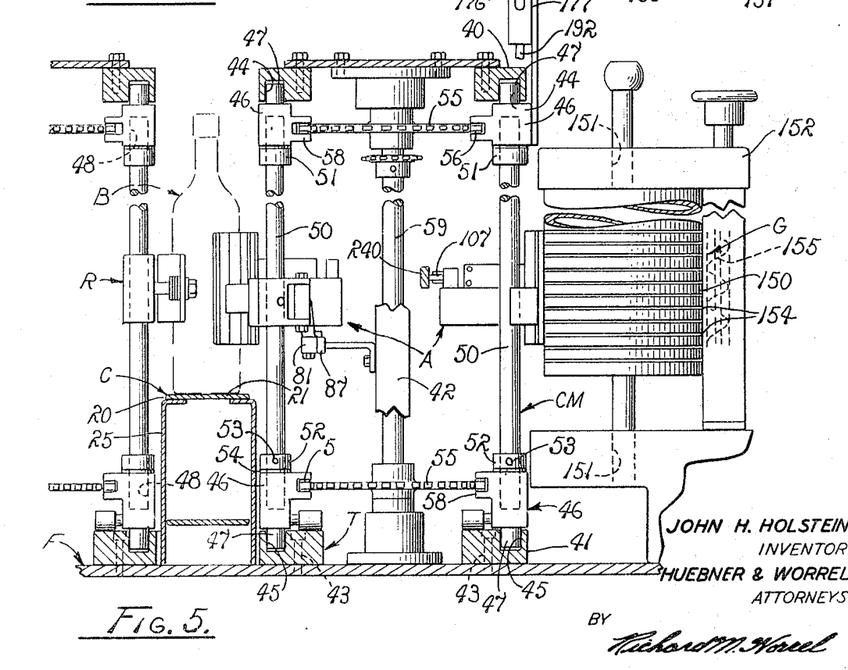
FIG. 5 is an enlarged view in vertical, transverse section taken in a plane represented by the arrows 5—5 of FIG. 3.
Figure 6:
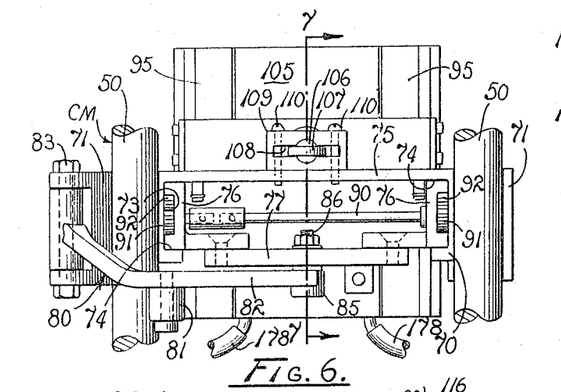
FIG. 6 is an enlarged view in rear elevation of one of the label applicator units, a portion of the supporting mechanism being shown fragmentarily.
Figure 7:
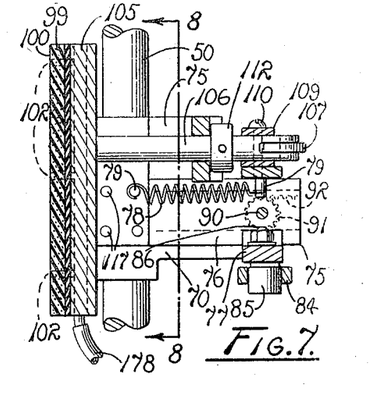
FIG. 7 is a view in vertical, transverse section taken on line 7—7 of FIG. 6.
Figure 8:
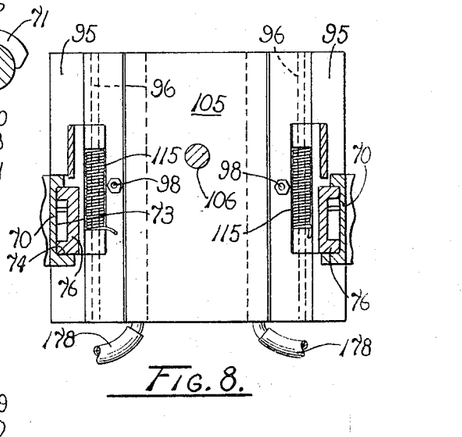
FIG. 8 is a view in front elevation and partly in vertical, transverse section taken in a plane represented by the arrows 8—8 in FIG. 7.

The roller 150 is provided with a plurality of uniformly axially spaced peripheral grooves 154 which are supplied with a glue or other suitable adhesive by means of a distributing screw 155 also mounted for rotation in the frame 152 (FIG. 5). As can be seen in FIG. 2, a doctor blade 156 is supported in contact with the periphery of the roller 150 to remove any excess glue over the amount desired to be applied to the rear face of a label 122. A reservoir 157 is provided as the source of glue to be distributed by the screw 155 to the peripheral grooves of the roller. Means, generally indicated at 158, are also provided to power the roller 150 and distributing screw 155 for rotation and are included in the drive means, generally designated as D. As viewed in FIGS. 1 and 3, the roller 150 is powered for rotation in a clockwise direction and at a rate to provide a peripheral speed equal to the rate of movement of the applicator units A motivated about the circuitous path of travel. The cylinder 150 and the elements operatively associated therewith constitute a means to deposit glue or other adhesive on the rear face of a label subsequently to be applied to one of the bottles B.

Pneumatic system

Figures 11, 12, 13, 14:
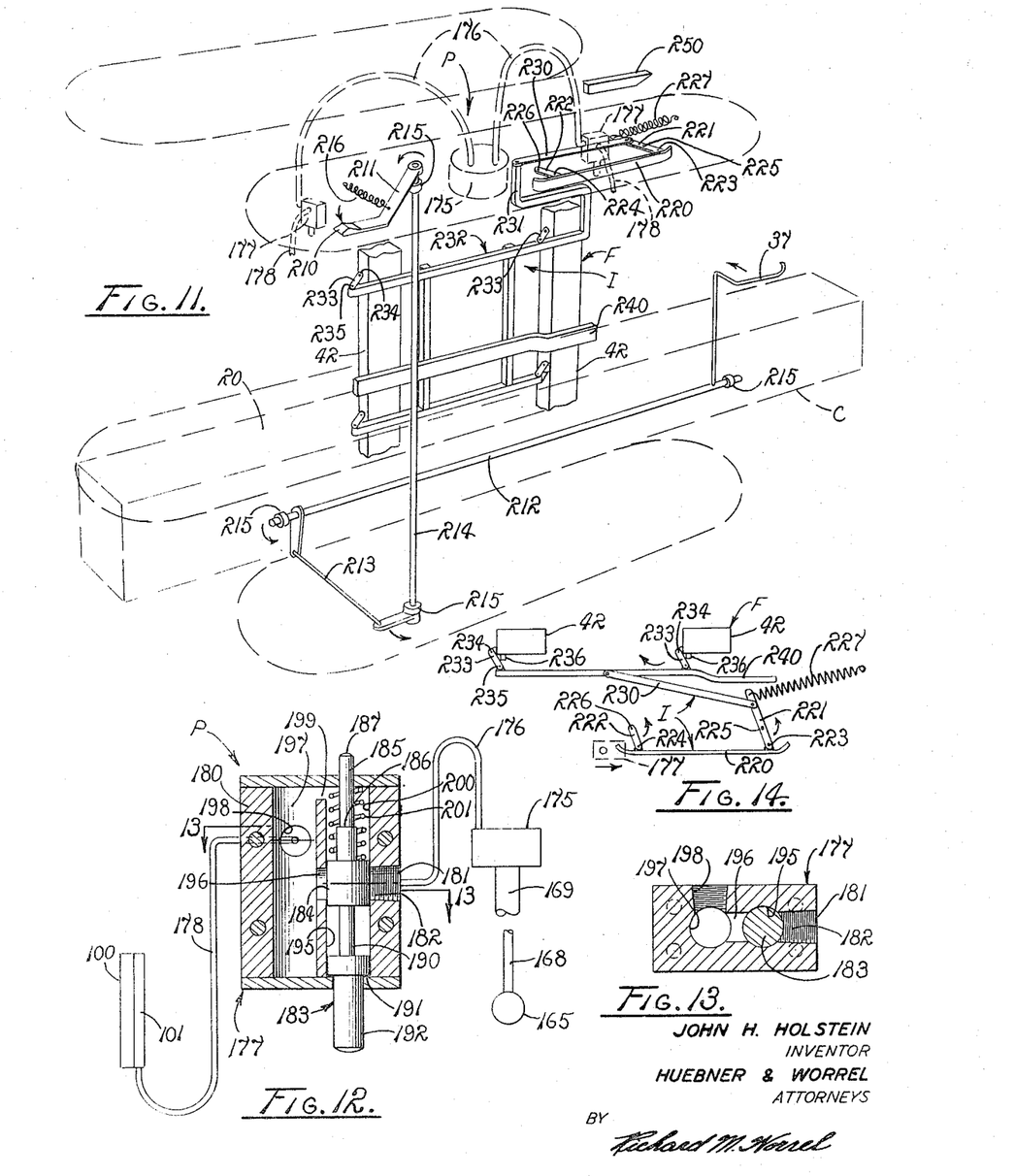
FIG. 11 is a perspective view of the interlock systems employed in the present invention, portions of the label applying machine being shown schematically.
FIG. 12 is a view in vertical, transverse section of the pneumatic valve employed in the label applying machine, and showing schematically other portions of the pneumatic system employed in conjunction therewith.
FIG. 13 is a view in horizontal, longitudinal section taken from a position represented by the arrows 13—13 in FIG. 12.
FIG. 14 is a top plan view of the glue interlock system provided in the labeling machine.

A pneumatic system P is provided as a means to retain individual labels 122 on the faces 100 of the applicator pads 99 during a predetermined portion of the circuitous path of travel of the pads. As shown in FIGS. 2 and 12, the pneumatic system includes a pump 165 driven by a portion of the power train D, indicated schematically at 166. A discharge line 167 in pneumatic communication with the pump is connected by a suitable conduit not shown, to the flexible hose 141 of each of the label riffler nozzles 140.

The vacuum or suction side of the pump 165 includes an inlet conduit 168 in communication with a central pipe 169 secured to the lower deck 41 of one of the track assemblies T.

The pipe 169 rotatably supports a distributor manifold 175 in communication with the pipe. A plurality of individual inlet hoses 176 are extended from the manifold to individual control valves 177 respectively mounted on each of the carrier masts of the machine. Flexible hoses 178 extended from each valve to the vacuum conduit 101 provided for the respective applicator unit A complete the vacuum or suction circuit.

Th details of the control valve 177 are shown in FIGS. 12 and 13, which include a schematic illustration of the pneumatic system P. The control valve comprises a body 180 provided with an inlet port 181 in communication with a passageway 182. A valve spool, generally indicated at 183, is provided with a central land 184 normally blocking the passageway 182. An upper stem 185 extends from the land and is provided with a shoulder 186 to limit the range of movement in an upper direction, as viewed in FIG. 12, and terminates in a projecting tip 187. The purpose of the tip 187 is to move the valve spool to a closed position, as shown in FIG. 12. A lower stem 190 extends downwardly from the central and is provided with a similar shoulder 191 to limit downward movement and a projecting tip 192 is provided as an operating member for the valve.

The body 180 is provided with a cylindrical bore 195 of a sufficient diameter to receive the central land 184 of the spool 183 in a substantially pneumatic sealing relationship, but permitting reciprocation of the spool 183 within the bore. The bore 195 is in communication with an internal passageway 196 leading to a chamber 197 within the valve body. An outlet port 198 in the chamber is connected by means of the hose 178 with the label applicator pad 99. A holding relay port 199 provides pneumatic communication between the chamber 197 and a holding chamber 200. A biasing spring 201 circumscribing the stem 185 urges the valve spool to a closed position as shown, so that the land 184 blocks communication between the passageways 182 and 196. It can be seen that upon movement of the valve spool upwardly a sufficient distance so that the land 184 uncovers the passageways 182 and 196 thereby providing communication therebetween, a suction or vacuum will be present at the passageways 102 provided in the face of the label applicator pad 99. The suction or vacuum should be of a sufficient value firmly to retain a label 122 on the face 100 of the applicator pad when the valve spool is moved to an open position. The function of the holding relay port 199 and the holding chamber 200 is to maintain the valve spool in an open position whenever the applicator pad passageways 102 are blocked by a label 122. Accordingly, the valve 177 not only constitutes a control means to determine when a label is to be picked up by an applicator pad, but also constitutes a means to detect the presence and absence of a label on the pad, since the valve spool is held in an open, upwardly disposed position by the vacuum system when the passageways 102 are closed by a label; if no label is present, the open passageways 102 permit air to enter, breaking the vacuum in the holding chamber 200, and thus allowing the spool to move to a downwardly disposed position.

The interlock

The interlock I includes two separate components, which have separate respective functions. The first is to render the label pickup means inoperative when no bottle is present at the bottle admission station 30, and the second is to render inoperative the means to deposit glue when no label 122 is present on a face 100 of a pad 99 advancing into the glue depositing station. The former shall be referred to as the label issuing interlock, and the latter shall be termed a glue interlock.

The label issuing interlock comprises a valve actuating cam 210 secured to a supporting lever 211 and adapted to be swung to the position shown in FIG. 11 upon the presence of a bottle B at the admission station 30. The linkage to operate the lever 211 and thus position the cam 210 in the path of the projecting tip 192 of the control valve 177 includes a first rock shaft 212 connected by a link, indicated at 213, to a second rock shaft 214. Suitable bearings schematically indicated at 215 support the linkage so formed for rocking movement on the frame F. A biasing spring 216 is secured between the supporting lever 211 and the frame F normally to urge the cam 210 out of the circuitous path of travel of the valve 177. Upon actuation of the detecting member 37 by means of a bottle traversing the conveyor C, the linkage is moved in the direction indicated by the arrows and thus positions the cam 210 in the path of the projecting tip 192. The cam ultimately is contacted by the tip 192 as movement progresses from the position shown, so that the valve 177 is moved upwardly to an open position as described above. If no bottle is present, the cam 210 is urged out of the path of the valve spool tip 192, and no vacuum is present at the passageways 102 of the label pad 99 to pick up and to hold a label thereon.

Referring to FIGS. 11 and 14, the glue interlock comprises an actuating cam 220 in the form of an elongated bar of a length corresponding to the length of the glue depositing station in the circuitous path of travel of the applicator units A. The cam is supported for movement between an operative position and a retracted inoperative position on the frame F by means of a lever 221 and a stabilizing link 222 pivotally connected to the cam by means of respective pivots 223 and 224. It is to be understood that in the embodiment shown all of the pivot pins provided in the glue interlock are supported in the linkage to operate about respective vertical axes. Such a pivot pin is provided for the lever 221 on the frame and is indicated at 225. A similar pivot pin 226 is provided for the link 222. The linkage so formed by the cam 220, lever 221, and link 222 is urged to an operating position as shown in FIG. 14 so that the cam 220 is positioned in the circuitous path of travel of the projecting tip 187 by means of a biasing spring 227. The spring interconnects the lever 221 and the frame F. Since the interlocks are illustrated schematically, the anchorages for the springs and the supports for the pivot pins are not shown structurally.

The lever 221 is connected by means of a drag link 230 to an operating lever 231 which extends from a parallelogram linkage, generally indicated at 232. The linkage is supported in an over-center condition as shown in FIG. 14 by means of four individually supporting links 233 pivotally connected in parallel relation upon the standards 42 by individual linkage pivots, indicated at 234. As stated above, these pivots operate about respective vertical axes. Likewise, pivots 235 within the parallelogram linkage 232 are disposed to provide vertical pivotal axes. As shown in FIG. 14, the upper supporting links 233 engage stops 236, and the linkage is shown in an over-center condition. A cam 240 is supported on the linkage and positioned to engage the cam follower 107 associated with the backing block 105 of each of the applicator units A. The parallelogram linkage, when in such an over-center condition, can provide a reaction force sufficient to effect movement of the backing block toward the glue roll.

If no label is present on the face 100 of a given pad 99, the vacuum in holding chamber 200 will be insufficient to maintain the valve spool 183 in an upwardly disposed position and the spring 201 will move the spool to the position shown in FIG. 12. Accordingly, the lower projecting tip will engage the cam 220, as the applicator unit A, with which the particular valve is associated, moves farther in its circuitous path. Upon engagement of the cam 220 by the projecting tip 192 of the control valve 177, the linkage is moved in the direction indicated by the arrows in FIG. 14 to swing the individual supporting links 233 in a clockwise direction, as viewed in FIG. 14, thereby positioning the cam 240 in a retracted position out of the circuitous path of travel of the cam follower 107. Such a retracted position is illustrated in FIG. 11.

Also provided on the frame F and supported on the upper deck 40 of the track mechanism T is a fixed-position, label release cam 250. The function of this cam is to release the valve 177 by contacting the upwardly projecting tip 187. The cam 250 is not related to the interlock I, but is positioned to move the valve to a closed position as a particular applicator unit A enters the label applying station and thereby to release the label from the respective applicator pad to permit the label to be applied to a bottle or the like.

Figure 3:
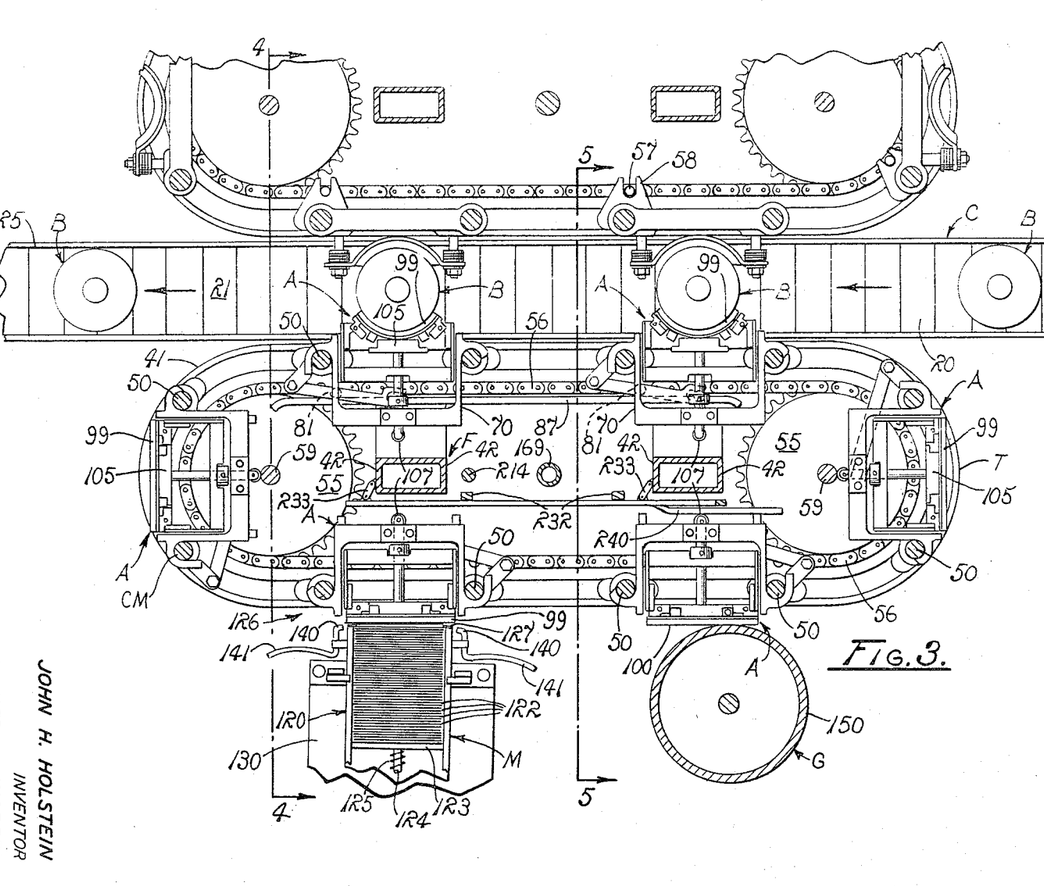
FIG. 3 is an enlarged view in horizontal, longitudinal section taken on line 3—3 of FIG. 2.
Figure 4:
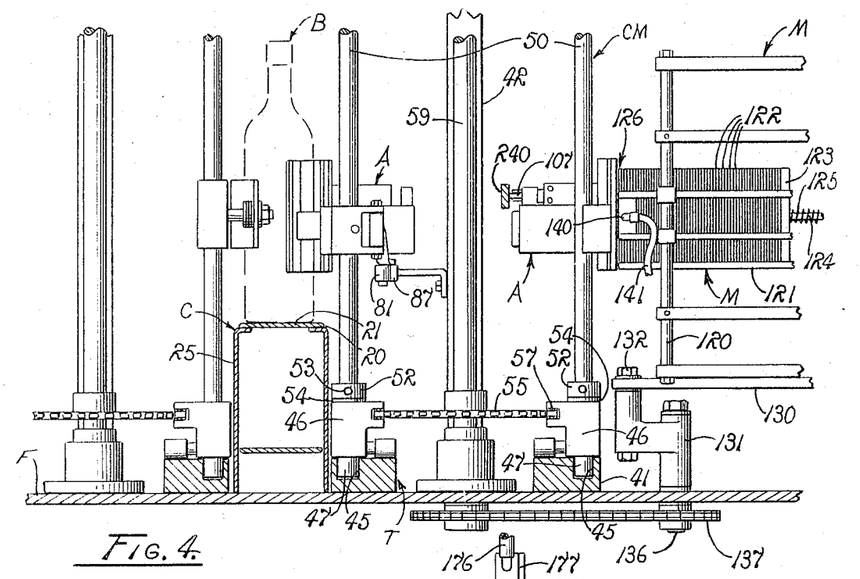
FIG. 4 is an enlarged view in vertical, transverse section taken in a plane represented by the arrows 4—4 of FIG. 3.

The cam 87 is fixed to the upright standards 42, as illustrated in FIG. 3, and serves to engage the cam followers of the respective applicator units A as they are motivated through the label applying station. The reaction pads R are spaced along their respective track assembly T at intervals corresponding to those of the applicator units and engage the bottles during passage through the label applying station. If desired, the reaction pads can readily be in the form of other applicator units so that labels can be applied simultaneously to both sides of the bottles.

Operation

The operation of the described embodiment of the subject invention is believed to be readily apparent and is briefly summarized at this point. Assuming that the conveyor C is operating at a predetermined rate synchronized with other conveying mechanisms, not shown, in a food or drink processing plant, and that the bottles, indicated at B, are supplied to the conveyor at the right side of FIG. 1. The drive means D powers the conveyor at the predetermined rate and through the drive train schematically shown motivates the applicator heads A about the circuitous path of travel defined by their respective track assembly T. Simultaneously, the reaction members R supported on the opposing track assembly are motivated in an opposite rotational direction at the same linear rate of travel. The bottles are moved from the admission station 30 of the conveyor C and are spaced thereon at uniform intervals by the timed rotation of the starwheel 31. The intervals of spacing on the conveyor conform to the intervals of spacing of the applicator units A on the track assembly. The presence of a bottle at the admission station is detected by the detector member 37 of the interlock I and through the linkage comprised by the supporting lever 211, the rock shafts 212 and 214, and the link 213, the valve actuating cam 210 is moved into a position to open the pneumatic control valve 177. This movement of the interlock linkage is more clearly shown in FIG. 11. The cam 210 is positioned on the track assembly so that in an operative position it will be contacted by the pneumatic control valve 177 of a particular applicator unit A which will subsequently apply a label to that bottle which is actuating the detector member at the bottle positioning station. Accordingly, a bottle must be present at the bottle admission station 30 to move the cam 210 into the path of a given pneumatic valve 177 of an applicator unit.

Continued progressive movement of the applicator unit A about the circuitous path of travel defined by the track assembly T causes the pneumatic valve 177 carried thereon to contact the cam 210. This will open the valve and connect the source of vacuum, such as the pump 165, to the passageways 102 in the face 100 of the applicator pad. Simultaneously, the magazine is oscillated through the beam and crank mechanism and urges the particular label at the issuing station 126 against the face of the applicator pad and supports it in contact therewith during a short portion of the circuitous path of the applicator unit. The relative positions of a given applicator unit and the magazine during the period of issuing a label to an applicator pad, can be more clearly seen in FIG. 3. The riffler nozzles 140 insure that only a single label is issued at one time. Assuming that the label is released from the magazine and maintained in contact with the pad by the differential air pressure, the pneumatic conduit 176 will be closed at the face of the pad resulting in a partial vacuum in the holding chamber 200 of the valve 177. The valve is therefore maintained in an open position so long as a label is closing the passageways 102 in the face of the pad. This is important in that the glue interlock system is dependent upon the positions of the projecting tip portions 187 and 192 of the valve spool 183. Assuming that the valve is being maintained in an open position and that a label is being retained on the face 100 of the applicator pad, the valve spool 183 will be raised from the position shown in FIG. 12 so that the projecting tip 192 will be unable to engage the actuating cam 220. Accordingly, the glue cam 240 will remain in the position shown in FIG. 11 to urge the carriage 75 of the applicator unit toward the glue roll G and apply an adhesive to the exposed underside of the label retained on the pad.

Since the glue roll G is being driven at a speed such that its peripheral rate of travel is synchronized with the movement of the applicator units A about their circuitous path, the position of the label on the applicator pad is not disturbed and a uniform layer of adhesive is deposited on the underside of the label. Further progressive movement of the same applicator unit about the circuitous path carries that unit to a position entering the label applying station. The applicator unit and the same bottle which triggered the detector member 37 at the bottle admission station 30 are carried along parallel paths through the label applying station 38. This may be seen in FIG. 3 wherein two applicator units are illustrated as passing through the label applying station, and each is applying respective labels to individual bottles. As the applicator units proceed through the label applying station, the respective cam follower 81 of each of the applicator units engages the label applying cam 87. The profile of the cam 87 is such that the carriage 75 of the applicator unit is urged toward the bottle to press the label into intimate contact with the peripherly thereof. The resilient applicator pad 99 carried by the support arms 95 which are pivotally mounted in the carriage 75, permits the pad to conform to the configuration of the bottle and urges the label into conforming contact therewith. The cam 250 is positioned with respect to the cam 260 so that the pneumatic valve 177 is moved to a closed position at the time the label is urged into contact with the bottle. The valve is closed by means of the upper projecting tip 187 of the valve spool 183 contacting the label release cam 250 and moving the valve to a closed position. Accordingly, the label is released from the face of the pad but held in intimate contact with the bottle a sufficient length of time to permit adhesion thereto while passing through the label applying station. Then, upon subsequent release by the pad through the action of the retraction springs 78, the label firmly adheres to the periphery of the bottle. The applicator unit then proceeds through the circuitous path to pick up another label and repeat the above cycle. The bottles, which labels applied thereto, are discharged at the left side of the conveyor C as viewed in FIG. 1.

It is to be observed that the reaction pads R maintain the bottles on the conveyor C during the period of label application. If desired, the reaction pads may be in the form of other label applicator units, thereby permitting simultaneous application of labels to both sides of the bottles.

It is to be noted that in the event that no bottle is present at the bottle admission station 30, its absence is detected by the detector member 37 thereby swinging the cam 210 out of the path of valve 177 associated with the particular applicator unit A then proceeeding toward the label issuing station. Accordingly, the pneumatic valve 177 remains in a closed position so that a label is not issued from the magazine to the face 100 of the applicator pad 99 as the magazine urges the outermost label into contact with the pad.

Continued movement about the track assembly of that applicator unit which does not carry a label, then renders the glue interlock operative. The downwardly projecting tip 192 of the valve 177 contacts the cam 220 of the glue interlock linkage, thereby moving the cam 240 from the path of the cam follower 107. Accordingly, the applicator pad 99 will not be urged into contact with the glue roll. This is desired since no label is present on the face of the pad and any glue deposited thereon would render the pad incapable of performing its function in the automated labeling machine.

It is also to be observed that the particular track assembly structure which supports the carrier masts in their circuitous paths of travel, provides a rigid structure and insures that absolute synchronized movement between the applicator units and the bottles on the conveyor C occurs at all times. In addition, the particular swivel blocks or trucks 46 provided at both the upper and lower ends of each of the carrier masts CM permit a positive drive through the sprockets 55 and the chain 56. Since each of the individual drive pins 57 does not support any of the weight of their respective carrier mast, the motivating portion of the track assembly is entirely separated from the weight supporting structure, namely, the races 44 and 45 and the swivel blocks 46. This insures that the carrier masts will maintain a predetermined position throughout their travel of the circuitous path defined by the track assembly.

Accordingly, it can be seen that an automatic label applying machine has been provided which can be driven at a rate compatible with other conveying mechanism in a processing plant while insuring that each and every bottle that proceeds through the bottle admission station will receive a label stored in the magazine. Once the machine is set into operation, and a supply of labels and suitable adhesive is made available, the machine can be left to run unattended and the interlock mechanisms insure proper operation.

The machine also lends itself to a flexible of operations, in that various applicator units can be mounted on the carrier masts as well as being adjusted to various elevational positions. This readily adapts the machine to a variety of container configurations and does not necessarily limit it to the bottles as illustrated in the drawings.

A specific example of another type of label applicator unit which can be mounted on the carrier masts is one adapted to apply an elongated relatively narrow label to the neck of a bottle, wherein the label length in an affixed position extends substantially throughout a circumferential extent of the label applying surface. It is a normal practice in the application of such labels to the necks of commercial containers, such as glass bottles, to employ a label of a length greater than 360° of circumferential peripheral surface of the container. Accordingly, a predetermined portion of the label must necessarily overlap an underlying portion, which is initially attached to the bottle. For obvious reasons, such labels are termed "wrap-around" labels.

For purposes of clarity, an applicator adapted to affix such labels has not been illustrated in the label applying machine of FIG. 1. However, my co-pending application entitled "Label Applying Apparatus" and filed concurrently herewith illustrates an applicator unit specifically adapted to affix such wrap-around labels to the circumferential periphery of a container.

During the application of such a wrap-around label, it is apparant that the entire length of the label cannot be urged into contact with the container in a single operation by the simultaneous application of a force about the container periphery. Consequently, one end of the label is urged into contact with the container, such as one of the bottles illustrated at B in FIG. 1, and a predetermined portion of the label is concurrently secured to the label applying surface afforded by the bottle. It will be appreciated that a predetermined portion of the label will remain extended from the label applying surface, and in the case of a substantially cylindrical surface, the label will extend tangentially therefrom. For purposes of clarity, such a label is illustrated at 255 in FIG. 1 without illustrating a label applicator unit adapted for this purpose. It will also be evident to those skilled in the art that suitable cam means, such as those illustrated at 87, are to be secured to the frame F at a predetermined point along the path of travel of the bottles B through the machine to effect a movement of the applicator unit toward the bottle thereby applying the label 255 to the peripheral surface afforded by the substantially cylindrical neck.

As the bottle moves along the path of travel, under the influence of the upper run 21 of the conveyor belt 20, the profile of the cam means employed permits a partial retraction of the applicator unit away from the bottle so that a label depressor means subsequently to be described can urge the projecting end of the label into intimate contact with the bottle.

To complete the application of the wrap-around label 255, a transverse bracket 260 is rigidly secured to the frame F of the machine and supports a depending rod 261 at a position adjacent to the path of travel of the bottles through the machine. An annular mounting band 262 is adjustably elevationally secured to the rod 261 by means of a setscrew 263. A similar annular mounting band 264 is rigidly secured to the band 262, such as by welding, in a relative position with the respective axes of the annular bands normal to each other. An adjustable setscrew 265 provided in the second band 264 permits longitudinal adjustment of a rigid support rod 266 slidably mounted in band 264. The rod 266 carries at its distal end a resilient depressor generally indicated at 267. The depressor 267 includes a flexible label engaging member 268, which, in the form illustrated, is a plurality of resilient bristles mounted in close proximity as in a conventional brush. Other suitable resilient materials will occur to those skilled in the art, and a variety of equivalents will perform satisfactorily, so long as the label engaging member is sufficiently flexible to be deflected upon movement of a bottle along the path of travel while also being capable of exerting a sufficient force to urge the previously extended end of the label into intimate contact with the surface of the bottle. The annular mounting bands 262 and 264 permit a flexibility of elevationally and azimuthal adjustments to position the flexible label engaging member 268 at the required position without interfering with other moving components in the machine.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a label applying machine, the combination of means to advance an article along a rectilinear path of travel at a predetermined rate; applicator means for applying a label to said article during movement thereof along a portion of said path; means for motivating said applicator means along a path of travel adjacent to said portion at the predetermined rate and synchronized with said article, including a pair of elevationally spaced upper and lower deck members having juxtapositioned races therein, a plurality of linearly spaced pairs of upright carrier masts, means supporting the masts for guided movement about a circuitous path of travel defined by said races, and power means for driving the masts about said path; and means for effecting relative movement between the article and the applicator means to apply a label to the article.

2. The label applying machine of claim 1 wherein said means for supporting the masts comprises individual swivel trucks rotatably fitted at each end of the several masts, and wherein each of the trucks is provided with a pair of longitudinally spaced guide pins slidably received in a respective one of said races.

3. The label applying machine of claim 2 wherein said power means for driving the masts comprises two respective pairs of elevationally spaced sprockets, the sprockets of each pair being longitudinally spaced substantially coextensive with the races in said deck members, continuous chains trained about each pair of sprockets, and a plurality of drive pins carried by each chain at uniform intervals of spacing, and wherein one of the swivel trucks at each respective end of each pair of carrier masts is provided with a yoke pivotally and drivably connected to a respective one of said drive pins.

4. In a label applying machine wherein an article is advanced along a rectilinear path of travel at a predetermined rate, the combination of a frame; a label applicator adapted to hold a label in intimate contact with the periphery of the article; means supporting the applicator on the frame for movement along a path of travel a portion of which is adjacent to said rectilinear path; means operatively associated with the applicator for effecting relative movement between the applicator and the article; means mounted on the frame along said applicator path for supplying labels to the applicator in single units, including a magazine holding a plurality of individual labels, the magazine having an open issuing end, resilient biasing means urging the labels toward the issuing end, means normally retaining the labels within the magazine, and drive means to oscillate the magazine and to impart a linear motion to said issuing end for a predetermined distance along a portion of said path of travel of the applicator support means; means associated with the applicator for picking up and retaining a label thereon prior to applying said label to an article; and means mounted on the frame for applying glue to said label prior to contact with the article.

5. The label applying machine of claim 4 wherein said drive means to oscillate the magazine comprises a beam and crank mechanism including a supporting frame, a crank member rotatably mounted in the frame and powered for rotation, a link having one end pivotally mounted in the supporting frame, and the magazine interconnects the crank and the other end of the link.

6. The label applying machine of claim 4 wherein said issuing end of the magazine is provided with at least one pneumatic riffler nozzle connected to a source of air under pressure.

7. The label applying machine of claim 4 wherein means are borne by the frame and adapted to detect the presence and absence of an article in the machine and to render inoperative the label pickup means in the absence of an article.

8. The label applying machine of claim 4 wherein means are borne by the frame and adapted to detect the presence and absence of a label on the applicator and to render inoperative the glue applying means in the absence of a label on the applicator.

9. The label applying machine of claim 4 wherein said means to pick up and to retain the label on the applicator prior to applying said label to an article includes a source of vacuum a conduit interconnecting said source and the applicator, including a passageway provided in the applicator and adapted to be closed by a label, and valve means interposed in the conduit and being shiftable alternatively to open and to block the conduit.

10. The label applying machine of claim 9 wherein a cam is pivotally mounted on the frame and is shiftable between an extended operative position and a retracted inoperative position, the cam in an operative position being adapted to shift the valve means to an open position to establish communication between the source of vacuum and the passageway in the applicator.

11. The label applying machine of claim 10 wherein means are borne by the frame and adapted to detect the presence and absence of an article in the machine and to render inoperative the label pickup means by maintaining said cam in a retracted inoperative position.

12. The label applying machine of claim 11 wherein the detecting means includes a contacting member supported in the frame in juxtaposition to said rectilinear path of travel to be contacted by an article moving along said path, and linkage means interconnecting said member and said cam to shift said cam to an extended operative position upon the member being contacted by an article in said path.

13. The label applying machine of claim 4 wherein said means for applying glue to said label includes a glue dispensing roll mounted in juxtaposition to the path of travel of the applicator, and wherein glue cam means are borne by the frame and adapted to be shifted to and from an extended operative position to be contacted by the applicator during travel thereby to urge the applicator toward the glue roll, and a retracted, inoperative position.

14. The label applying machine of claim 13 wherein means are borne by the frame and adapted to detect the presence and the absence of a label on the applicator and to shift said glue cam to a retracted, inoperative position in the absence of a label.

15. The label applying machine of claim 14 wherein said means to pick up and to retain the label on the applicator prior to depositing glue on said label includes a source of vacuum, a conduit interconnecting said source and said applicator, including a passageway provided in the applicator and adapted to be closed by a label, and valve means interposed in the conduit and being shiftable alternatively to a first position to open the conduit and establish communication between said source and said passageway and a second position to block communication therebetween, and wherein the position of the valve means is determined by the presence or absence of a label on the applicator subsequent to passing the label supplying means during travel along said path.

16. The label applying machine of claim 15 wherein said valve means comprises a valve body having a longitudinal bore therein, inlet and outlet ports provided in communication with the bore and respectively in communication with the applicator unit passageway and the source of vacuum, and a valve spool longitudinally slidably received in the bore in sealing relationship thereto and shiftable between said first position and said second position, the longitudinal bore including a holding chamber in communication with the inlet port when said spool is in said first position, the vacuum in said chamber being sufficient to retain a label on said applicator when said applicator passageway is closed by a label and also sufficient to hold said spool in said first position when said applicator passageway is closed by the label.

17. The label applying machine of claim 16 wherein actuating cam means are borne by the frame and operatively linked to said glue cam means, and wherein said valve spool includes a projecting portion adapted to engage said actuating cam means thereby to shift said glue cam to a retracted inoperative position when said valve spool is in said second position to block communication between the applicator passageways and the source of vacuum subsequent to said applicator passing the label supplying means and indicating the absence of a label on said applicator.

18. The label applying machine of claim 16 wherein a label release cam is fixed to the frame at a location adjacent to said rectilinear path followed by the article, and said valve spool includes a projecting tip adapted to contact said label release cam when the spool is in said first position thereby to move the spool to said second position.

19. A label applying machine comprising a supporting frame; conveyor means mounted in the frame and adapted to advance articles successively along a predetermined rectilinear path of travel at a predetermined rate; applicator means carried by the frame and adapted to hold labels in intimate contact with the peripheries of such articles; mounting means carried by the frame and transporting the applicator means in a circuitous path of travel a portion of which is adjacent and parallel to said rectilinear path; drive means having driving connection to said conveyor means and said mounting means synchronously driving the same so that articles are advanced along their rectilinear path with applicator means transported along the adjacent parallel portion of their path; a label supply magazine; means mounting the magazine for travel with the applicator means during a portion of the latter's circuitous path; means for issuing labels one at a time from the magazine to the applicator means; means for retaining the issued labels one at a time on the applicator means; means for applying glue to said issued labels while retained on the applicator means; and means borne by the frame and adapted to effect relative movement between the applicator means and the articles to cause intimate contact of the labels with the latter after glue is applied thereto including means to maintain such such contact throughout a predetermined portion of said rectilinear path of travel.

20. In a label applying machine, the combination of a main frame; a conveyor to advance a plurality of containers along a rectilinear path of travel at a predetermined rate through the frame; support means for the conveyor to maintain the conveyor adjacent to the frame; a starwheel rotatably mounted adjacent to the conveyor to admit individual containers at predetermined intervals of spacing on the conveyor; means borne by the frame and providing a pair of vertically spaced races defining a circuitous path of travel; a plurality of mast assemblies mounted in the races and constrained to said circuitous path; a label applicator head carried by each of the mast assemblies; a label magazine; a beam and crank linkage supporting the magazine on the frame for oscillatory movement, the magazine having an issuing end mounted adjacent to said circuitous path and vertically aligned with said label applicator heads; a source of vacuum; conduit means interconnecting said source and each of the label applicator heads; normally closed valve means interposed in said conduit means; first cam means operatively associated with said valve means to open same upon contact therewith; interlock means connected between the container admission station and said first cam means effective to move the cam means into an operative position upon admission of a container to the conveyor; a glue dispensing roll disposed adjacent to said circuitous path; second cam means normally operative to urge said applicator head toward said glue roll; interlock means between said pneumatic valve and said second cam means effective to move said cam means out of a range of operation when no label is issued by said magazine; and third cam means carried by the frame and engageable with said label applicator heads to move the heads into container contacting positions thereby to apply a label to the container and to hold the label in contact therewith during a predetermined portion of said rectilinear path.

21. A labeling apparatus comprising a conveyor adapted to convey articles in predetermined spaced relation along a predetermined path of travel, a label applicator unit, means mounting the unit for travel in a circuitous path having a portion adjacent and parallel to the path of the articles, driving means connected to the conveyor and to the unit mounting means motivating the conveyor and said mounting means at the same linear rate with the unit and articles synchronized for travel together along the parallel portions of their paths, a label magazine, means mounting the magazine for circuitous travel in a predetermined path with a portion of said path adjacent to the path of travel of the applicator unit and in advance of the portion thereof parallel to the conveyor path, said drive means having connection to the magazine mounting means and synchronizing movement of the magazine with the applicator unit to coincide during their travel of their respective adjacent paths, means operatively associated with the magazine to release labels one at a time therefrom when the magazine is adjacent to the applicator unit, vacuum means connected to the applicator unit adapted to hold labels one at a time thereagainst as received from the magazine, and positioning control means connected to the applicator unit adapted to advance the unit toward the articles borne by the conveyor during traversal of the parallel paths of the articles and applicator unit to apply the labels to the articles and to retract the applicator unit from the articles after application of the labels.

22. The labeling apparatus of claim 21 in which the applicator unit includes segments adapted to fold about the articles when the applicator unit is advanced and adapted to assume a planar relationship when the applicator unit is retracted.

23. The labeling apparatus of claim 21 including an interlock connected to the label issuing means responsive to articles conveyed on the conveyor whereby labels are issued from the magazine to the applicator unit only when the conveyor has an article thereon positioned to receive the label from the unit.

24. The labeling apparatus of claim 21 including glue applying means mounted adjacent to the path of travel of the applicator unit between the magazine and the position of unit advancement toward the conveyor adapted to supply glue to labels held by the unit.

25. The labeling apparatus of claim 24 including an interlock connected to the glue applying means and responsive to the presence of a label on the unit precluding glue application in the absence of a label on the unit.

26. In a machine adapted to affix an accessory item to the external surface of a target article, the combination of means to advance the target article along a rectilinear path of travel at a predetermined rate; affixing means for securing the accessory item to said article during movement thereof along a portion of said path; means for motivating said affixing means along a path of travel adjacent to said portion at the predetermined rate and synchronized with said target article, including a pair of elevationally spaced upper and lower deck members having juxtapositioned races therein; a plurality of linearly spaced pairs of upright carrier masts; means supporting the masts for guided movement about a circuitous path of travel defined by said races; and power means for driving the masts about said path; and means for effecting relative movement between the article and the affixing means to effect intimate contact between the accessory item and the article.

References Cited by the Examiner

UNITED STATES PATENTS

| | | | |
|---|---|---|---|
| 1,252,879 | 1/1918 | Bredenberg | 156—364 |
| 2,214,096 | 9/1940 | Weiss | 156—364 |
| 2,661,109 | 12/1953 | Gerhardt | 156—476 |
| 2,773,617 | 12/1956 | Weiss | 156—364 |
| 2,940,630 | 6/1960 | Carter | 156—352 |

EARL M. BERGERT, *Primary Examiner.*

J. P. MELOCHE, *Assistant Examiner.*